United States Patent [19]

Alvarez

[11] 4,399,455

[45] Aug. 16, 1983

[54] TELEVISION VIEWER

[76] Inventor: Luis W. Alvarez, 131 Southampton Ave., Berkeley, Calif. 94707

[21] Appl. No.: 274,760

[22] Filed: Jun. 18, 1981

Related U.S. Application Data

[63] Continuation-in-part of Ser. No. 56,035, Jul. 9, 1979, abandoned, and a continuation-in-part of Ser. No. 128,641, Mar. 10, 1980, Pat. No. 4,301,468.

[51] Int. Cl.³ .............................................. H04N 9/31
[52] U.S. Cl. ...................................... 358/60; 358/63; 358/231
[58] Field of Search ................... 358/60, 63, 231, 237

[56] References Cited

U.S. PATENT DOCUMENTS

| | | | |
|---|---|---|---|
| 2,326,042 | 8/1943 | Lessman | 350/128 |
| 2,528,510 | 5/1946 | Goldmark | |
| 2,653,183 | 9/1953 | Goldsmith | 358/60 |
| 2,706,930 | 4/1955 | Jansen | 358/231 |
| 2,726,573 | 8/1950 | Maloff | |
| 4,051,535 | 9/1977 | Inglis | 358/231 |
| 4,054,907 | 10/1977 | Itoh | 358/60 |

*Primary Examiner*—Michael A. Masinick
*Attorney, Agent, or Firm*—Philip M. Shaw, Jr.

[57] ABSTRACT

A viewing system for use with a cathode ray tube display comprising an objective lens which focuses the display image onto a limited light diverging screen having orthogonally arranged lenticular lenses on its opposite planar surfaces and which diverts the projected light to produce an image of maximum brightness in a hypothetical ellipse having a major dimension of six inches and minor dimension of two inches at a viewing distance of sixteen inches.

12 Claims, 4 Drawing Figures

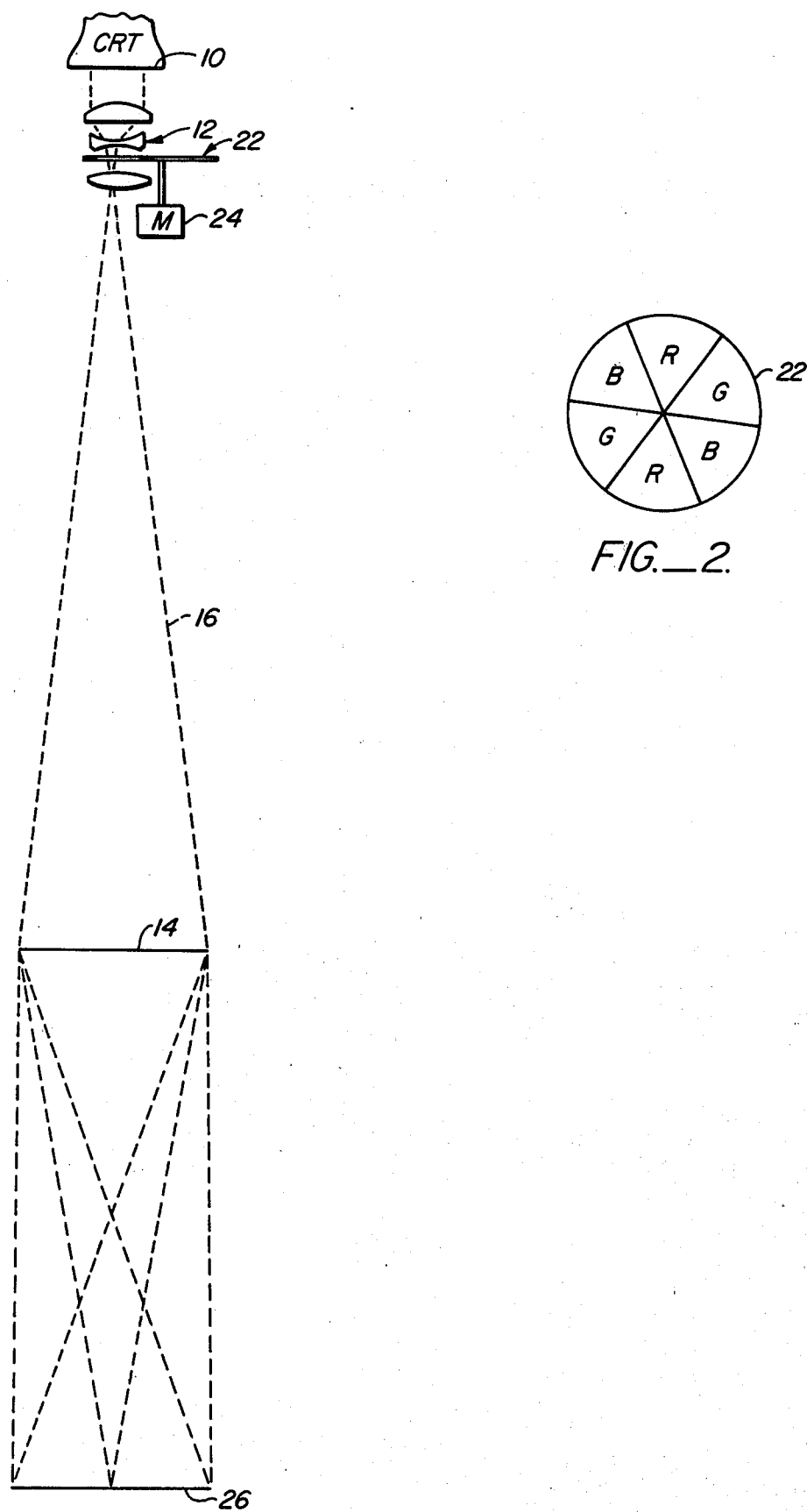
FIG._1.
FIG._2.

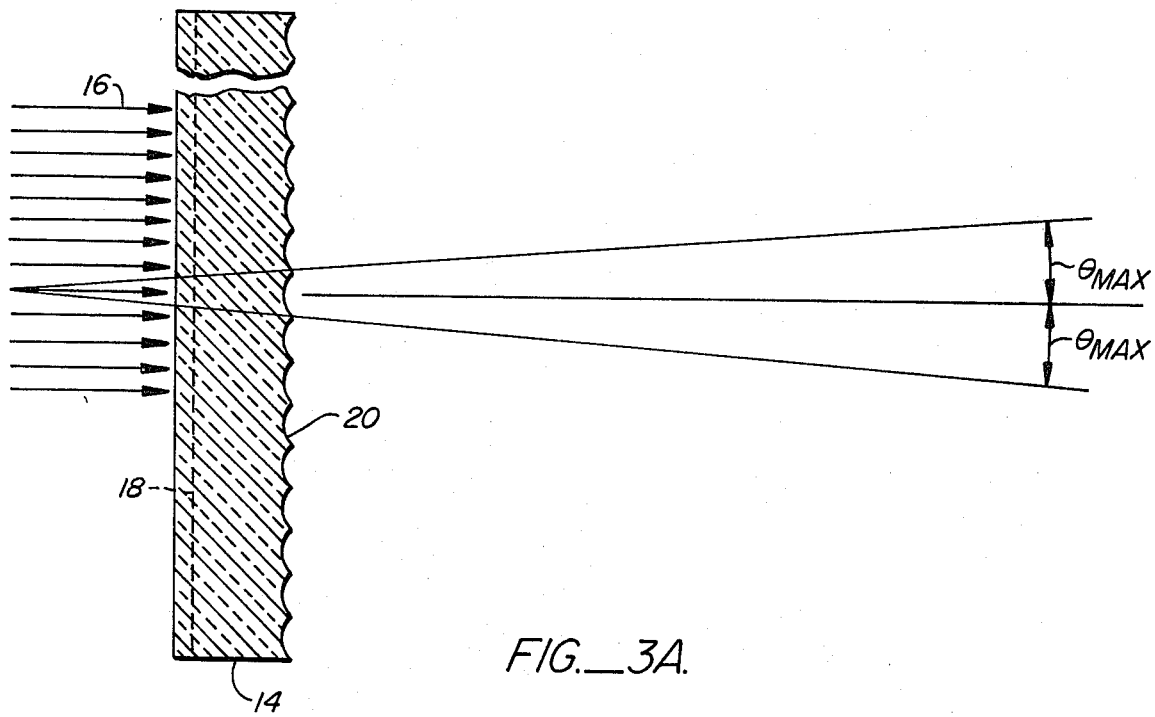
FIG._3A.
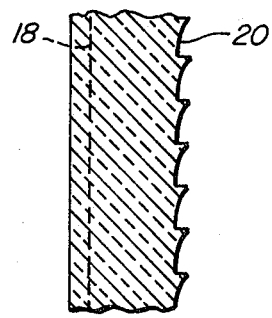
FIG._3B.

TELEVISION VIEWER

CROSS-REFERENCE TO RELATED APPLICATIONS

This application is a continuation-in-part of my co-pending applications Ser. Nos. 056,035, filed July 9, 1979, now abandoned and 128,641, filed Mar. 10, 1980, and issued as U.S. Pat. No. 4,301,468 on Nov. 17, 1981, both entitled COLOR TELEVISION VIEWER.

BACKGROUND OF THE INVENTION

This invention relates to a television viewing device and, more particularly, to such a device which receives television signals, reproduces images from those signals, and optically projects those images onto a compact viewing screen.

Among the many problems of projecting a real image of a small television tube face over a wide range of distances, focusing it always on a wide screen, is that the apparent brightness of the image drops rapidly as the screen is moved away. Another important consideration is that the cathode ray beam "spot size" is measured as a function of the picture height. As the size of the picture tube gets smaller, the diameter of the spot must go down proportionally, if we demand that the vertical resolution in the picture does not degrade. However, if we want the same screen brightness, we need the same number of electrons hitting per unit area on the screen in a unit of time. Thus, when the spot size shrinks in area, the required beam current decreases as the picture height, squared. Conversely, if the beam current remains the same, the picture becomes brighter as the picture size shrinks in area. This analysis leaves out a number of parameters that influence screen brightness, but in general, it is easier to produce a high resolution, bright picture in a small size than it is in large sizes.

Furthermore, a miniaturized screen, with an appropriate optical display, lends itself to a closed circuit, "color wheel" type system in which a black and white CRT field sequentially displays images which are sequentially viewed by an observer through a revolving color filter wheel whose revolutions are synchronized with the field scanning rate of the CRT display.

A rotating color wheel display has two separate and important advantages over the standard shadow mask technology. The first is that no adjustments are needed to make all three "subfields" appear in exact registration over the whole area of the display. Shadow masks require the use of electron optical systems whose optical axes are inclined to each other. This feature makes it necessary to employ circuits to eliminate "keystoning," the distortion of a rectangular raster into a trapezoidal shape. This feature also insures that electron beams corresponding to the same spot in the three primary colors traverse different paths of the deflecting fields which causes a different kind of raster misregistration that must also be corrected to give the best possible image. The second advantage is that there is no structure to the image due to the coarse mask structure. In raster scanned displays, the raster line structure causes a much smaller degradation of the image, and it can be rendered invisible by increasing the number of scanning lines to match the resolution of the human eye. In "vector scanned" displays, the rotating color wheel display will yield the most perfect color picture ever seen, with neither "color fringing" nor image degradation due to mask structure or scanning live structure.

In the earliest rotating color wheel systems, the face of the cathode ray tube was viewed directly, so it was necessary to employ a color wheel larger in radius than the actual screen size. Such a structure would not be acceptable to present day users. In the present invention, with its use of specially designed projection optics, the rotating wheel can be smaller in diameter than the height of the final viewing screen, so it does not require a "bulge" in the cabinet. And the wheel can be placed at many different points along the optical axis, at the choice of the designer.

SUMMARY OF THE INVENTION

The present invention solves the above described brightness problem and obtains the advantages of small screen projection by projecting the CRT image through a projection lens onto a limited, light diverging screen mounted orthogonal to the optical axis of the projection lens. The screen includes at least one lenticular, Fresnel field lens surface to control the amount of light divergence produced by the screen. In the preferred embodiment the screen has a pair of parallel plane Fresnel lenses, each of which is composed of a plurality of parallel, straight line elements, and with the elements of one lens being oriented orthogonally with respect to the lens element of the other lens.

In a modification of the preferred embodiment, the projection lens is bifurcated and a revolving color filter wheel is inserted between the two sections of the lens. The revolutions of the wheel are synchronized with the presentation of images on the CRT screen which were viewed by the originating television camera through a corresponding color filter wheel, or which were generated by other means, and stored in a memory bank. This produces a composite color image.

It is therefore an object of the present invention to provide a viewing apparatus for magnifying the apparent size of a smaller television screen.

It is another object of the invention to provide a screen for viewing an image projected from a planar display while maximizing brightness.

The foregoing and other objectives, features and advantages of the present invention will be more readily understood upon consideration of the following detailed description of certain preferred embodiments of the invention, taken in conjunction with the accompanying drawings.

BRIEF DESCRIPTION OF THE DRAWINGS

FIG. 1 is an optical diagram for use in explaining the optical mechanism according to the invention;

FIG. 2 is a vertical view of a color filter wheel for use in the embodiment depicted in FIG. 1; and FIGS. 3A and 3B are enlarged, vertical, sectional views of portions of the specially tailored field lens screen in the embodiment depicted in FIG. 1.

DETAILED DESCRIPTION OF CERTAIN PREFERRED EMBODIMENTS

Referring now more particularly to FIG. 1, the optics of the invention are illustrated. The planar display image, presented on the face of a cathode ray tube (CRT) screen 10 for example, is focussed onto a specially designed screen 14 by means of a projection lens 12. As will be explained in greater detail hereinafter, in some embodiments a filter wheel 22 can be interposed to intersect the projection lens 12.

The purpose of the screen 14 is fundamentally similar to that of the familiar back-projection screen. Light photons 16 that are brought to a focus at the plane of the screen are scattered at the screen so that they cover a larger solid angle after striking the screen than they occupied on their way from the projection lens to the screen. In an ordinary projection screen, the scattered light covers most of a hemisphere beyond the screen, so that viewers situated at many places can see the image focussed on the screen. We want the screen to have scattering properties intermediate those of a normal back projection screen and a system where the scattering angle is only a few times greater than the width of the incident cone of light from the projection lens to the scattering screen.

The advantage of the present design is that the viewer can be far enough away from the screen so that he or she can easily focus on it without needing eye lenses. If the screen is at a "comfortable reading distance" of 16 inches, no special eye lenses are required. The user can see the screen clearly without any intervening lenses, or if any are required, they will be in the form of ordinary spectacles, worn by the user. But to keep the apparent angular width of the screen at the desired $\pm 10°$, the screen is only 5.6 inches wide.

Since the screen is to be viewed by only one user, we can eliminate the light scattered by a normal back projection screen into those parts of a plane, 16 inches from the screen, that will never be occupied by the user's eyes. That design condition permits the image to be much brighter than would normally be possible with a back projection screen. The designer can set any area of the plane at the viewing distance to be illuminated at the maximum available brightness, and then design the properties of the screen to achieve that illumination pattern. It has been shown that the smaller the illuminated area, the brighter the image, so the designer must make a compromise between brightness, and the need for the user's head to be exactly in the same place, all the time he or she watches the screen.

No standards are available in this matter, but one can benefit by remembering that persons driving an automobile are not bothered by keeping their head centered with respect to the entrance pupil of their rear view mirror system, which is about 2 inches high and 6 inches wide. Therefore, in what follows, the screen will be designed so that light focussed on any part of the screen will be scattered in a controlled way so that equal numbers of photons from that spot on the screen hit all parts of an ellipse 26 at sixteen inches from the screen, that has a major horizontal axis of six inches, and a minor vertical axis of two inches. The user will then be able to see all parts of the screen with the same intensity, if his or her eyes are anywhere in that ellipse. It should be noted that in this modification, the user views a real image, rather than a virtual image.

The design specifications have now been set down, and in what follows, a method of achieving those specifications is outlined. The screen 14 is a specially contoured Fresnelled field lens with a pitch so fine that the user can't see the individual lines. With reference to FIGS. 1, 3A and 3B, the face of the screen 14 directed towards the lens 12 is provided with a plurality of parallel, linear, semi-cylindrical, concave or convex lens elements 18. The lens elements 18 are oriented such that their longitudinal axes project out of the plane of FIG. 1 and lie parallel to the planes of FIGS. 3A and 3B.

The back side of the screen 14 is provided with a plurality of semi-cylindrical, parallel, linear, concave or convex lens elements 20 which are at right angles to the elements 18. FIG. 3A shows the geometry of both the horizontal and vertical lens elements near the center of the screen where the grooves are more or less symmetrical. At the edges of the screen the grooves, both horizontal and vertical, are more tilted as depicted in FIG. 3B, to act as a combination of field lens and controlled scatterer. Thus it can be seen from FIGS. 3A and 3B that the back side of the screen 14 has a multiplicity of substantially horizontal stepped grooves 18 and vertical stepped grooves 20, having risers which have plane front surfaces, which are of progressively decreasing slope toward the center of the screen surface, and which face away from the center of the screen surface. Furthermore, each of these risers has superimposed thereon a concave (or convex) cylindrical lens configuration.

The horizontal lens elements are designed to spread the incoming light rays uniformly through vertical angles that have a maximum value of $6.25 \times 10^{-2}$ radians, and the vertical elements are designed to do the same spreading, horizontally, through angles up to $1.88 \times 10^{-1}$ radians. The maximum widths of the lens elements, to be invisible, should have an angular width of about one minute of arc as seen by the observer. At an observing distance of 16 inches this means that they have a width of 0.0047 inches. The elements are narrow enough that they will spread out the light by diffraction but that is not a significant effect. The characteristic diffraction angle is always $\theta = \lambda/a$, where $\theta$ is in radians, $\lambda$ is the wavelength in any units, and $a$ is the groove width in the same units. If we take $a = 4.7 \times 10^{-3}$ inches, and $\lambda = 2 \times 10^{-5}$ inches, we find $\theta = 4.3 \times 10^{-3}$ radians. At a 41 cm viewing distance, such an angle spreads a bundle of rays over a circle with a diameter of 41 $\theta = 0.176$ cm. Since this diameter is small compared to the 2 cm diameter that results from the finite aperture of the projection lens 12, diffractive effects can be neglected. The net effect of the screen 14 is to distribute the incoming rays over a 6 inch by 2 inch ellipse. Outside of a boundary region of approximately a little lens than one inch the intensity falls from a uniform plateau value to zero. This boundary region corresponds in width to the diameter of the exit pupil.

While the screen 10 is described as being a CRT screen, it should be apparent that it could be any planar display, such as an electro-luminescent panel display, for example.

Referring now more particularly to both FIGS. 1 and 2, in some embodiments a color filter wheel 22, divided into one or more sets of alternating red (R), green (G) and blue (B) segments, is rotated by a motor 24 in a plane which is parallel to the face of the CRT screen 10 and which intersects the projection lens 12. The rotation is synchronized with a corresponding color wheel rotated in front of the camera which generates the signal image being presented on the CRT screen, or with circuits that "scan" a memory bank. Such synchronization schemes are well known to those skilled in the art and will not be explained in greater detail here. This method of producing a combined, composite, colored image is, in fact, well known and it is only its use with the above described viewing screen which is considered part of the invention.

While a variety of suitable projection lenses are available, a Cook triplet or a double Gauss lens are particularly suitable. Such lenses should also have a relative aperture of f/2.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. A viewing system for use by a single viewer of a single electronic display comprising a projection lens having an aperture, a limited, light diverging screen viewed by the viewer, the screen having a Fresnel lens means incorporated therein with a front face and a rear face which optically faces the projection lens, wherein the projection lens projects the light image from the single electronic display onto the Fresnel lens means, the Fresnel lens means comprising a first set of parallel, straight lens Fresnel lens elements on the rear face and a second set of parallel, straight line Fresnel lens elements on the front face which are arranged orthogonal to the first elements, at least some of said first and second elements being contoured to act as a combined simple field lens for focusing an image of the projection lens aperture at an exit pupil located at a predetermined viewing distance from the screen while simultaneously spreading the image over an oval shaped area having predetermined minor and major axial dimensions and which is contained in a plane, parallel to the screen and located at the predetermined viewing distance from the screen, with substantially all of the light image passing through the projection lens hitting the exit pupil.

2. A viewing system as recited in claim 1 wherein the projection lens is bifurcated into separate halves and further comprising a rotatable, color filter wheel mounted to rotate in a plane located between the halves of the projection lens.

3. A viewing system as recited in claim 2 wherein the bifurcated projection lens comprises a pair of Cook triplet lenses taken back to back.

4. A viewing system as recited in claim 2 wherein the bifurcated objective lens comprises a double Gauss lens.

5. A viewing system as recited in claim 1 wherein the predetermined viewing distance is sixteen inches and the predetermined minor and major axial dimensions are two inches and six inches, respectively.

6. A viewing system as recited in claim 1 further comprising a rotatable, color filter wheel mounted to rotate in a plane which is perpendicular to, and intersected by the optical axis, with the diameter of the wheel being smaller than the height of the screen, and with the term height being taken in respect to a viewer of the screen.

7. A viewing system as recited in claim 1 wherein the predetermined viewing distance is sixteen inches and the predetermined minor and major axial dimensions are two inches and six inches, respectively.

8. A viewing system as recited in claim 1 wherein the maximum width of the straight line Fresnel lens elements is 0.0047 inches.

9. A viewing system as recited in claim 1 in combination with a field sequential, cathode ray tube display means for displaying black and white images in a predetermined sequence corresponding to predetermined colored images and further comprising a rotating color wheel having a plurality of individual colored segments, the rotating wheel being synchronized in its rotation with the predetermined color fields being displayed and being located near the projection lens such that the display image passes through the corresponding colored individual segments of the wheel as it rotates.

10. The combination recited in claim 9 wherein the diameter of the color wheel does not exceed the height of the screen, with the term height being taken with respect to the viewer of the screen.

11. A viewing system as recited in claim 1 wherein both the first and second sets of Fresnel lens elements are stepped grooves, the risers of which have plane front surfaces, are of progressively decreasing slope toward the center of the rear and front faces of the screen, face away from the center of the rear and front faces of the screen, and have superimposed thereon a concave cylindrical lens surface.

12. A viewing system as recited in claim 1 wherein both the first and second sets of Fresnel lens elements are stepped grooves, the risers of which have plane front surfaces, are of progressively decreasing slope toward the center of the rear and front faces of the screen, face away from the center of the rear and front faces of the screen, and have superimposed thereon a convex cylindrical lens surface.

* * * * *